United States Patent
Collins

(10) Patent No.: US 7,568,881 B1
(45) Date of Patent: Aug. 4, 2009

(54) SYSTEM AND METHOD FOR LOADING/UNLOADING CONTAINERS

(75) Inventor: Virgil L. Collins, Guttenberg, IA (US)

(73) Assignee: M & D RP, LLC, Ibera, OH (US)

(*) Notice: Subject to any disclaimer, the term of this patent is extended or adjusted under 35 U.S.C. 154(b) by 88 days.

(21) Appl. No.: 11/301,844

(22) Filed: Dec. 13, 2005

Related U.S. Application Data

(63) Continuation-in-part of application No. 10/767,594, filed on Jan. 28, 2004, now abandoned.

(51) Int. Cl.
*B60P 1/64* (2006.01)

(52) U.S. Cl. .................... 414/812; 414/346; 414/477

(58) Field of Classification Search ................ 414/478, 414/435, 473, 477, 346, 812
See application file for complete search history.

(56) References Cited

U.S. PATENT DOCUMENTS

| | | | |
|---|---|---|---|
| 3,130,847 A | | 4/1964 | Dempster et al. |
| 3,272,546 A | * | 9/1966 | Cooley .................. 294/2 |
| 3,485,400 A | * | 12/1969 | Pewthers .................... 414/477 |
| 3,786,949 A | * | 1/1974 | Sutton ........................ 414/406 |
| 3,858,927 A | * | 1/1975 | Sutton ..................... 294/68.26 |
| 3,874,537 A | | 4/1975 | Kou |
| 3,964,625 A | | 6/1976 | Wirz |
| 4,153,169 A | * | 5/1979 | Cipkowski .................. 414/434 |
| 4,204,793 A | | 5/1980 | Lemaire |
| 4,350,469 A | | 9/1982 | Corompt |
| 4,645,405 A | | 2/1987 | Cambiano |
| 4,802,811 A | * | 2/1989 | Nijenhuis ................... 414/478 |
| 4,915,567 A | * | 4/1990 | Ellingsen .................... 414/345 |
| 4,986,719 A | | 1/1991 | Galbreath |
| 5,163,800 A | * | 11/1992 | Raisio ........................ 414/500 |
| 5,192,189 A | * | 3/1993 | Murata et al. ............... 414/477 |
| 5,193,968 A | * | 3/1993 | Hicks ......................... 414/346 |
| 5,203,668 A | | 4/1993 | Marmur |
| 5,460,473 A | | 10/1995 | LaMora et al. |
| 5,601,393 A | | 2/1997 | Waldschmitt |
| 6,558,104 B1 | * | 5/2003 | Vlaanderen et al. ......... 414/498 |
| 7,377,592 B2 | * | 5/2008 | Kraenzle ..................... 298/12 |
| 2002/0146306 A1 | * | 10/2002 | Morrell ...................... 414/340 |
| 2004/0156701 A1 | * | 8/2004 | Scranton et al. ............. 414/491 |

FOREIGN PATENT DOCUMENTS

| | | |
|---|---|---|
| CA | 2131356 | 9/1994 |
| EP | 0564 403 A1 | 10/1993 |
| EP | 567363 A1 | 10/1993 |

(Continued)

OTHER PUBLICATIONS

Holt Specialty Equipment, Inc., Eagleville, Tennessee, Aug. 1, 1991 Brochure: "*Multilift Hooklift HL-26, HL-32*".

(Continued)

*Primary Examiner*—Charles A Fox
(74) *Attorney, Agent, or Firm*—John A. Artz; Dickinson Wright PLLC

(57) ABSTRACT

A container handling system and method for a wheeled transport vehicle is disclosed that is capable of loading and unloading large containers using both a hook lift and cable winch mechanisms.

6 Claims, 13 Drawing Sheets

FOREIGN PATENT DOCUMENTS

EP        0811 525 A1    12/1997

OTHER PUBLICATIONS

Stellar Industries Inc., Garner, Iowa, Specification Writer's Handbook, "*Hook Lift Loaders for Trucks*," Jul. 1996 Second Edition.

Waste Equipment Technology Association. "Recommended Practice." *Subject: Roll-off Frame Rated Capacity, WASTEC Recommended Practice.* (WRP Mar. 1996).

Elliot Equipment in Lincoln, Nebraska, photographs of hoist.

* cited by examiner

SYSTEM AND METHOD FOR LOADING/UNLOADING CONTAINERS

RELATED APPLICATIONS

This application is a continuation-in-part application of U.S. Ser. No. 10/767,594, filed Jan. 28, 2004.

FIELD OF THE INVENTION

This invention relates to a container handling system for a vehicle, more specifically it relates to a system and method for loading and unloading large containers from and onto wheeled vehicles, including emptying the contents of such containers.

BACKGROUND OF THE INVENTION

The art typically refers to systems for loading and unloading containers as "hook lifts." These systems have been extensively employed for the transport of various materials within the container. In the usual case, the container may be loaded or unloaded upon the bed of the truck or vehicle utilizing the hook lift system. One very typical and frequent use for such systems is in the picking up and hauling of refuse. An open top or closed top container may be delivered to a point of use and the hook lift used to deploy the container, which contains a lift bar, A-frame or other similar connection to engage the hook, on the terrain underlying the truck where it is left to be filled with refuse or the like. When the container is full, the truck returns to the point where the container has been deposited and through the use of the hook lift system, elevates the filled container onto the truck where it may be transported, along with its contents, to a location where the container is unloaded and emptied, like a landfill or other facility. Examples of hook lift systems are found in U.S. Pat. Nos. 6,558,104; 5,601,393; 4,350,469; 3,874,537; 3,964,625; and 4,204,793.

In addition to hook lifts, the art is familiar with cable hoist systems which accomplish the same loading and unloading function of the hook lift systems but use a cable winch system as described in U.S. Pat. No. 5,460,473. In this type of a system two hydraulic cylinders are typically used to move the cable about a fixed sheave attached to the front end of the vehicle hoist frame. In the fully retracted position the cable, which is wrapped around sheaves connected to the cylinders, is at its longest affective length and can be connected to the front end of a container located on the ground. As the cylinders extend, the effective length of the cable continuously shortens as it wraps around each of the two cylinder sheaves and then finally around the sheave attached at the front end of the hoist frame. As the effective length of the cable gets shorter, the container is pulled up and onto the vehicle, which is usually in a tilted position to facilitate loading and unloading of the container. Another more limited and specific type of lift mechanism is found in U.S. Pat. No. 3,130,847 that uses a bail device mounted on a reciprocating carriage assembly. The bail engages a plurality of specifically designed hook bars located and space along the underneath portion of the container. As the carriage is reciprocated back and forth along a short path at the back end of the hoist frame the successive reciprocation causes the bail to engage the next hook bars and causing the container to move forward a short distance. The reciprocation of carriage eventually pulls the container onto the hoist frame in a slow stepwise fashion. One major problem with all these existing systems for loading and unloading containers is that they each contain only one type of mechanism to pick-up a specific type of container. For example, in the case of the hook lift it can only pick up containers designed specifically to accept the hook and likewise, the cable winch system can only pick up containers designed for cable based systems. Thus, companies must at a minimum maintain and operate two types of vehicles, those with hook lifts and those with cable winches. A need therefore exists for a universal type of loading and unloading system that can load, transport, and unload all types of containers, including, but not limited to those containers specifically designed for conventional cable hoists or hook lifts. In other words, there is a need for a system that has both a hook lift and a cable winch that can be used interchangeably depending on the many various designs of containers or other structures that require loading, transportation and unloading.

Our invention solves this problem by using a sliding carriage design that transverses the entire length of an elongated body to allow multiple types of container and structure designs to be loaded, transported on a wheeled vehicle and unloaded.

SUMMARY OF THE INVENTION

It is the principle object of our invention to provide an improved system for loading and unloading containers and/or structures regardless of the design of container and/or structure, more specifically whether or not a container is designed as a hook lift or cable winch container.

Another object of our invention is to provide a system for attachment to a wheeled vehicle that allows an operator of the vehicle to service multiple types of container/structure without mechanical modification of the system prior to servicing the particular container/structure design.

One particular embodiment of our invention includes an elongated body that is attached to the wheeled vehicle's frame. The elongated body has a carriage that can slide the length of the body and is driven by a central hydraulic cylinder, such that when the cylinder is fully extended the carriage is positioned near the front end of the elongated body. By "front" or "front end" we mean generally a position that is towards the front or closest to the cab and engine of the vehicle, i.e. a position that is more towards the front than the middle. Likewise, when the cylinder is fully retracted the carriage is positioned at the rear or opposite end of the elongated body. Again, by "rear" or "rear end" we mean generally a position more towards the back end of the wheeled vehicle, i.e. more towards the back than the middle. This would require that one end of the central cylinder to be fixed at the rear end of the elongated body with the other end fixed to the carriage. The end of this cylinder that is fixed to the carriage can be the base or rod end of the cylinder. Alternatively, the central cylinder could have one end fixed to the front end of the elongated body and the other end to the carriage. In this configuration, when the cylinder is fully retracted the carriage is positioned at the front of the elongated body.

The elongated body is pivotally connected to the vehicle frame near the rear end of the frame. One or more hydraulic cylinders is pivotally attached to a support member located on the front portion of the vehicle frame and to the elongated body near the front end such that when the cylinder is fully retracted the elongated body is in a horizontal position parallel to and adjacent to the vehicle frame. When this cylinder begins to extend the front end of the elongated body moves upward in an arcuate path while the rear most end of the body moves downward. The pivot point being the connection between the vehicle frame and the elongated body located in the rear portion of the body. Raising the front end of the body while lowering the rear end facilitates loading and unloading the container. The body may also contain a number of rollers or other friction reducing surfaces positioned along the length of the body which also makes loading and unloading easier by reducing the friction between the container bottom and the body.

As mentioned, the carriage is slidably connected to the elongated body and can move along the body from front to rear along a track using bearing shoes or other friction reducing mechanism, such as rollers. The carriage contains the means or mechanism that connects to the container allowing the container to be pulled up and onto the elongated body. This mechanism may be a cable and sheave combination or a jib and hook device or a combination of both. If the carriage contains the jib and hook device, it will also contain at least one hydraulic cylinder that is capable of moving the jib and hook device through an arcuate path such that when the elongated body is in an elevated position the hook can engage an A-frame on a container, a ring, a trunion, lift bar, or other similar connector on the container. This will be more fully understood with reference to the figures and the description of a preferred embodiment described below.

Once the hook has captured or engaged the container, the cylinder(s) are extended to move the jib and hook device to its original starting point. Alternatively, depending on the orientation of these cylinders, they can be retracted to move the jib and hook device to its original starting point. The central hydraulic cylinder connected to the carriage is then operated (either retracting or extending depending on the configuration) to move the carriage from the rear of the elongated body to the front end and in so doing pulling the container along with it until the container is fully positioned on the elongated body. The cylinder(s) that elevated the elongated body is then retracted lowering the front portion of the body until it is in a horizontal or starting position parallel to the frame of the vehicle. However, it is within the scope of our invention that each of the hydraulic cylinders can be operated simultaneously. In other words, the elongated body can be moved at the same time as the sliding carriage and the hook and jib mechanism.

When the cable and sheave combination is used on the carriage, one end of the cable is fixedly attached preferably to the rear end of the elongated body. Alternatively, the fixed end of the cable can be attached to a cross member on the elongated body located in the rear portion of the body, or attached to the central cylinder in the rear portion of the body. The other free end of the cable is passed around a sheave that is fixed to the carriage. When the carriage is positioned at the rear of the elongated body, the free end of the cable is of sufficient length that it can be attached to a container designed to be used with a traditional cable winch system. The free end of the cable may contain a hook, latch, clasp or other suitable device to allow it to be removably connected to the container. Once the cable is connected to the container, the vehicle operator operates the central hydraulic cylinder causing the carriage to move to the front end of the elongated body. As the carriage moves forward so does the cable sheave which in turn reduces the length of the free end of the cable and thus pulls the container onto the elongated body. Because the cable is attached to the rear end of the body and is of a fixed length, when the carriage reaches the front of the elongated body the container is necessarily pulled all the way onto the body. Once the carriage is positioned to the front of the body and the container is fully on the body, then the cylinder(s) that lift the body is retracted, lowering the body and container to a horizontal or starting position. Again, there is no requirement that each cylinder or set of cylinders be operated in serial fashion and it is well within the scope of our invention that the cylinders may be operated simultaneously. When loading and unloading containers with the cable and sheave combination it is preferably, but not necessary, that the jib and hook remain in the upright and stowed position. Further details of the components and operation of the system will be evident from the following description of a preferred embodiment.

DETAILED DESCRIPTION OF PREFERRED EMBODIMENTS

Figure 1:
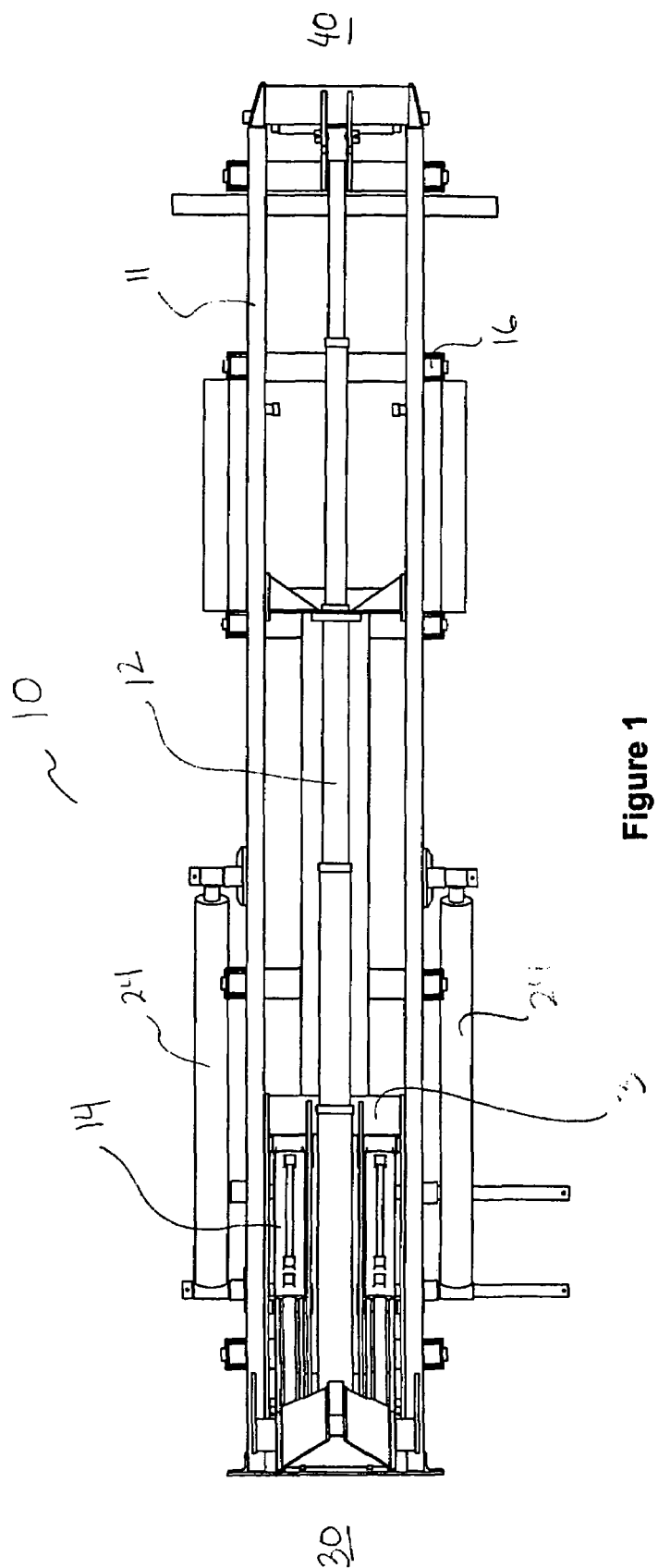
FIG. 1 is a top view of the loading and unloading system of our invention.
Figure 2:
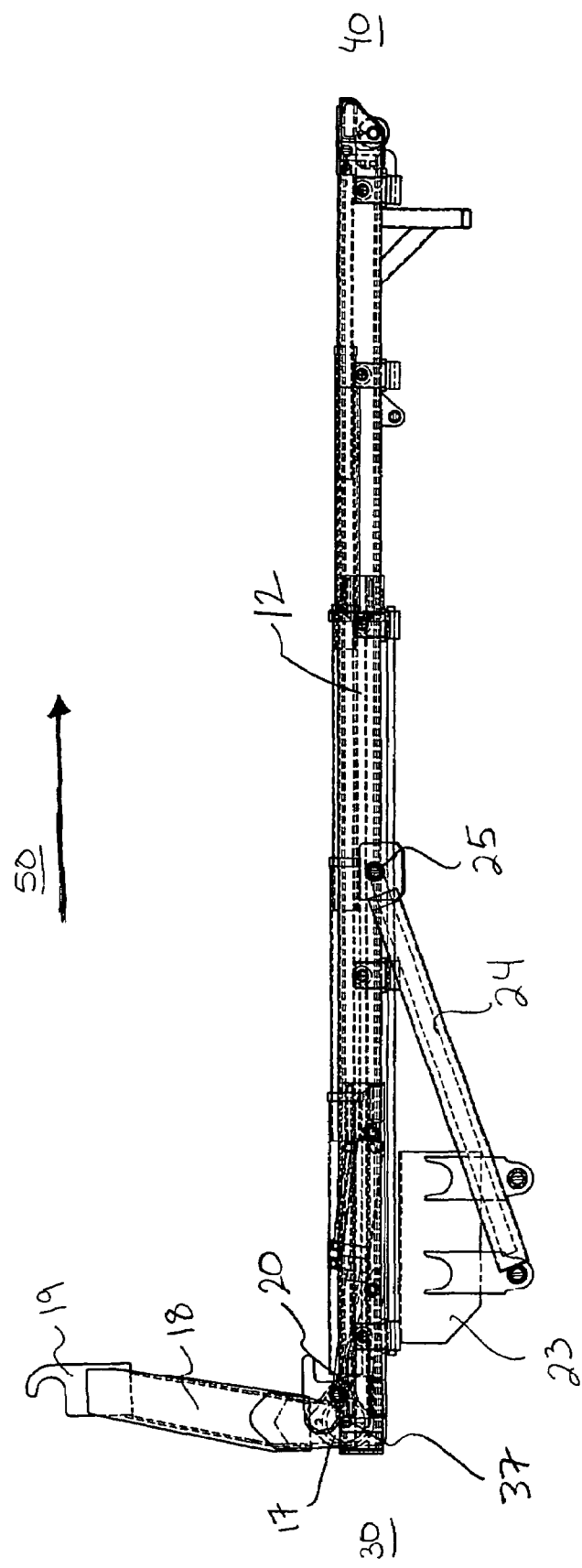
FIG. 2 is a side view of the system of our invention with the carriage in the forward position.
Figure 3:
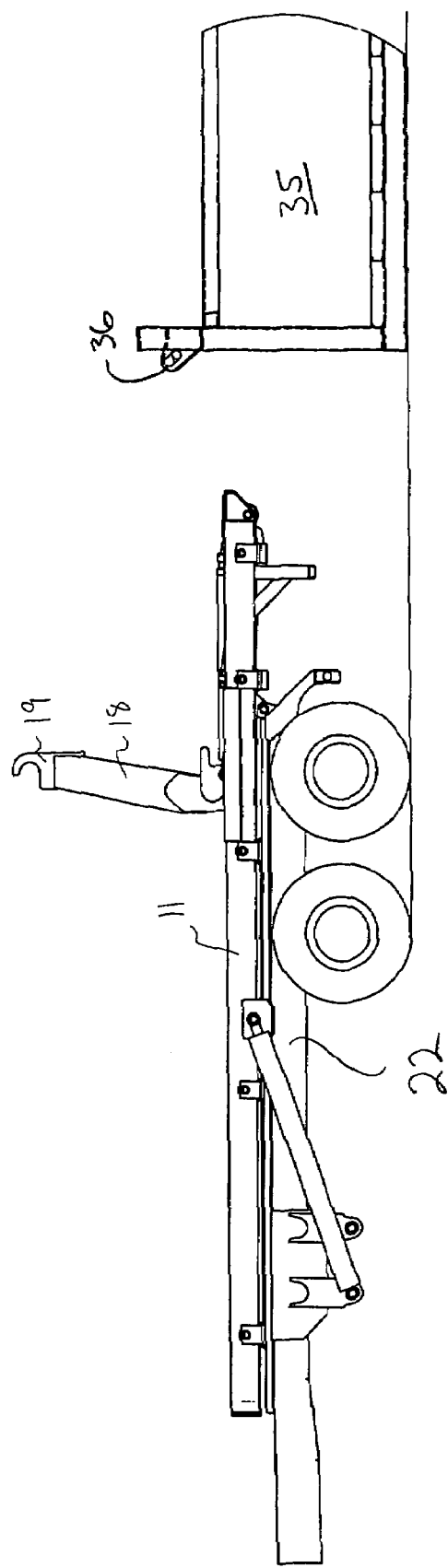
FIG. 3 is a side view of our invention connected to a wheeled vehicle where the slidable carriage in the rear position.
Figure 9:
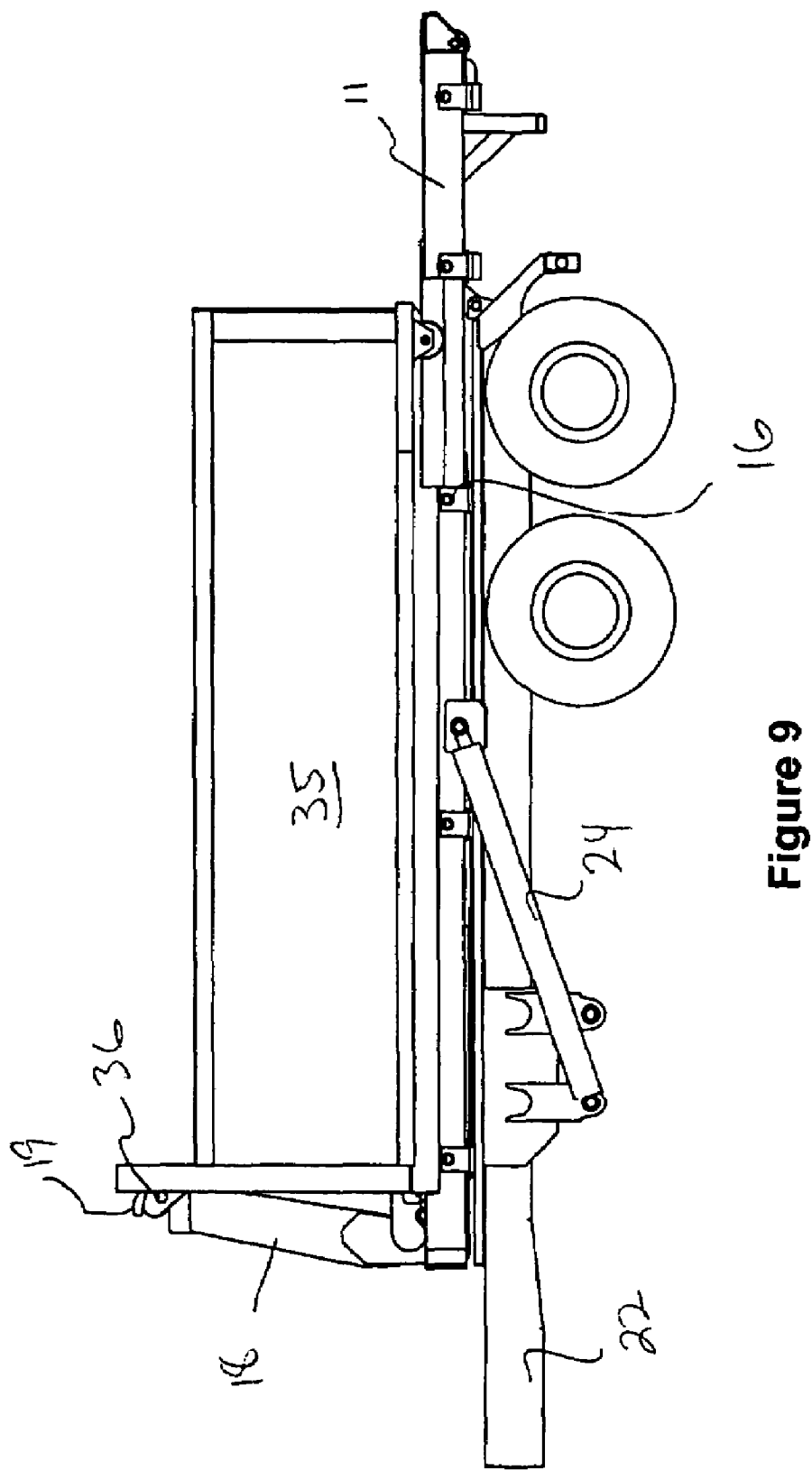
FIG. 9 is a side view of our invention using the jib and hook device showing a container fully loaded and with the carriage at the front position.
Figure 10:
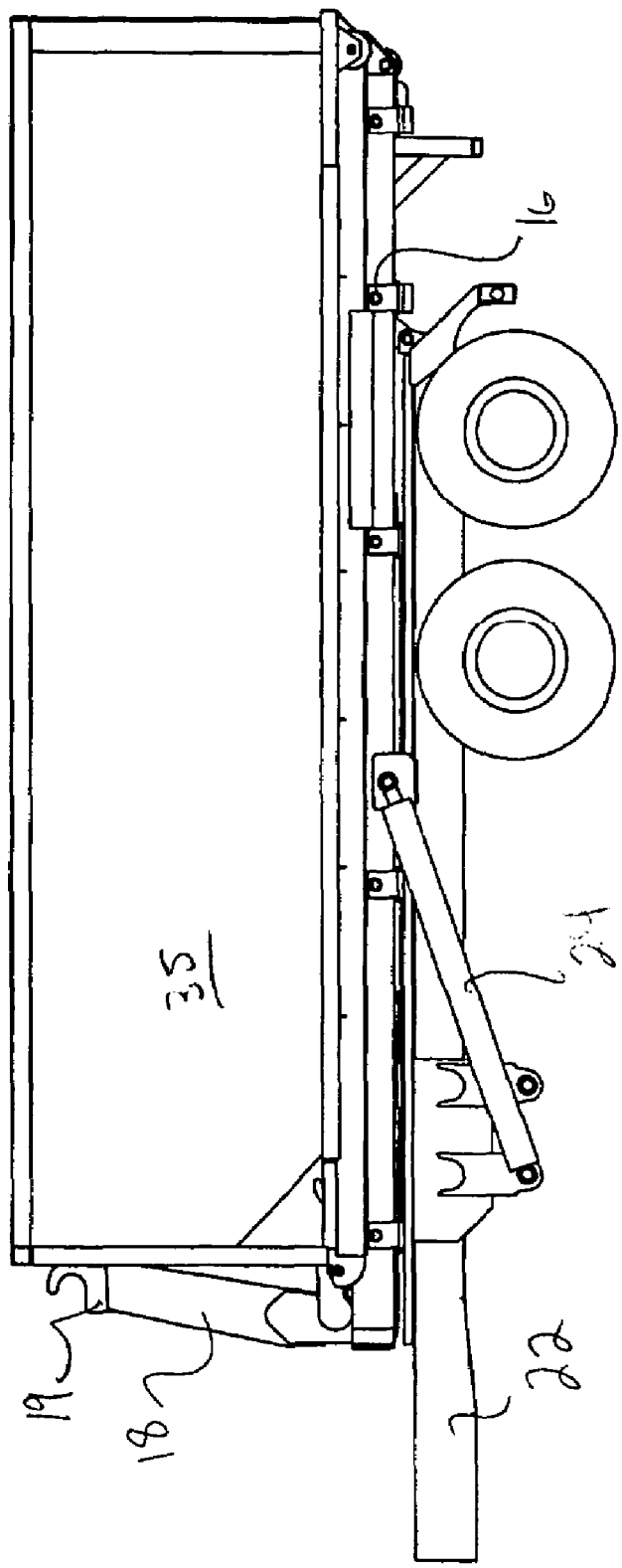
FIG. 10 is a side view of bur invention using the cable and sheave combination and showing a container fully loaded and with the carriage at the front position.
Figure 11:
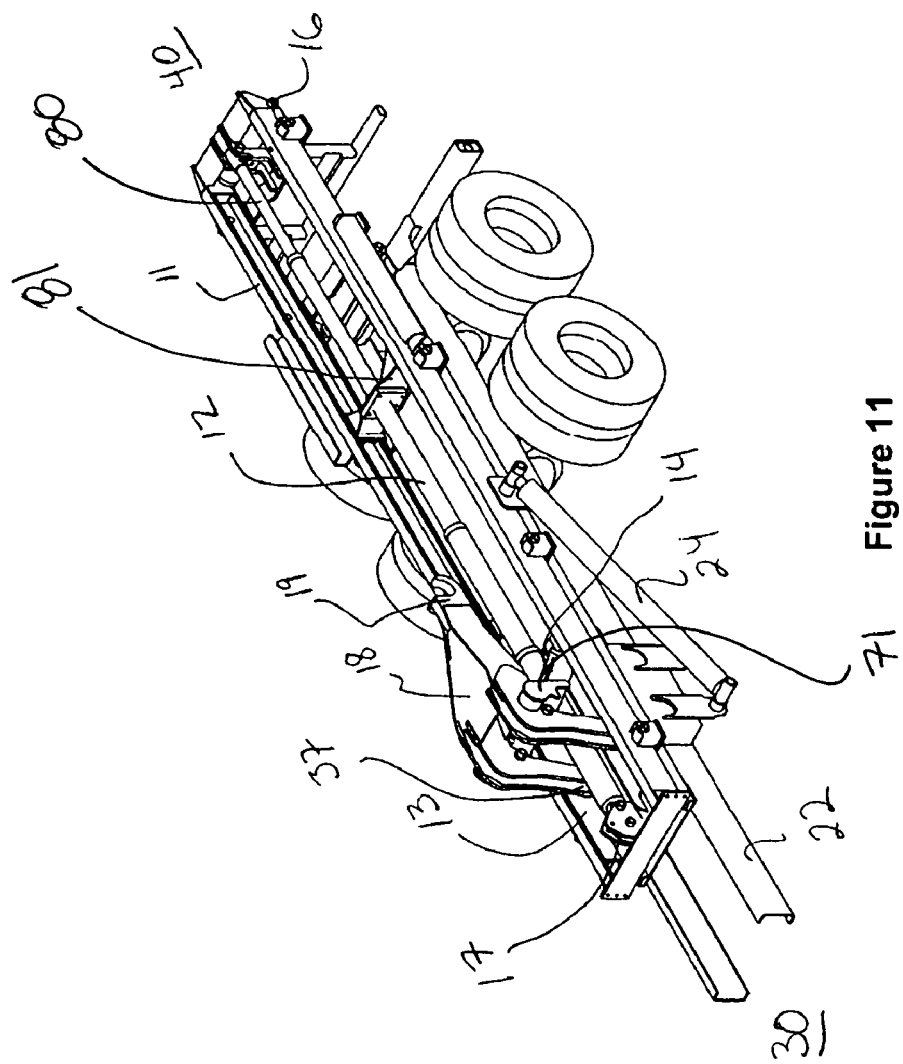
FIG. 11 is a perspective view of our invention showing the slidable carriage containing the jib and hook device and the central cylinder.
Figure 12:
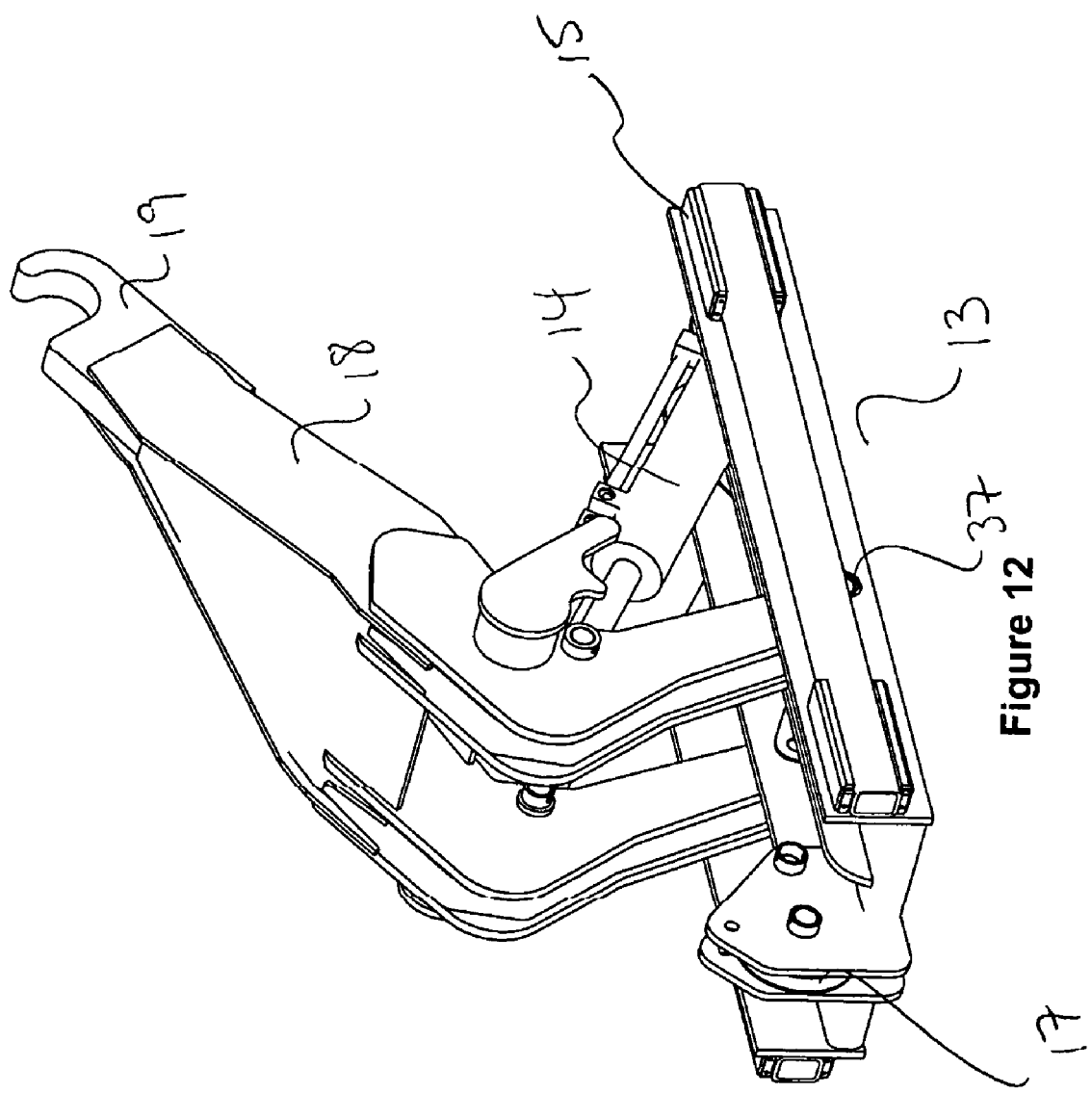
FIG. 12 is a perspective view of the slidable carriage of our invention.

Illustrated in FIGS. 1 through 11 are top, side and perspective views, respectively, of system 10 of our invention shown alone and as removably attached to a wheeled vehicle frame 22. The system of our invention includes, among other items, elongated body 11 with carriage 13 slidably connected thereto. Carriage 13 may contain one or more mechanisms that are capable of connecting to a container for loading and unloading purposes. Carriage 13 slides along the entire length of elongated body 11 using bearing shoes 15 and is moved by action of a central hydraulic cylinder 12, which preferably is a multi-stage cylinder. As explained, central cylinder 12 is fixed at one end to carriage 13 and at the other end to elongated body 11. As cylinder 12 retracts, carriage 13 moves in direction 50 toward the rear 40 of the body. At the fully retracted position of cylinder 12, carriage 13 is at the rear end 40 of body 11 as illustrated in FIG. 3. As illustrated in FIG. 11, cylinder 12 is supported by a slidable cylinder support 81 that is attached to cylinder 12 and is designed such that it moves along elongated body 11 when cylinder 12 is extended and retracted.

Figure 4:
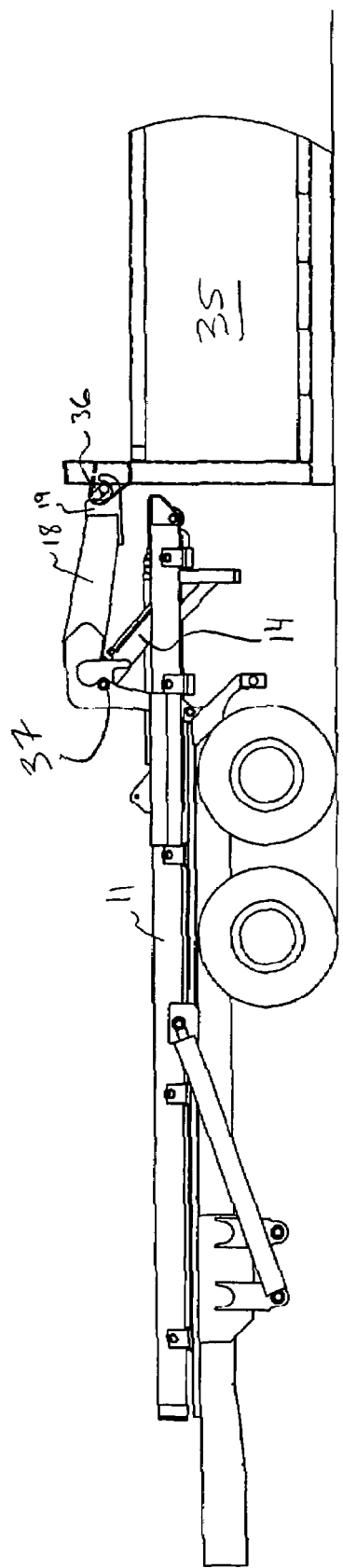
FIG. 4 is a side view of our invention connected to a wheeled vehicle where the jib and hook device is connected to a container.

Once carriage 13 is positioned at the rear of the body the operator can use either the jib 18 and hook 19 device or cable 20 and sheave 17 combinations to engage container 35. The particular engaging mechanism will depend on the specific design of the container. If the container has a lift bar 36 and is designed to be engaged by a hook lift type mechanism, then cylinders 14 on carriage 13 will be activated to raise jib 18 about pivot point 37 as shown in FIG. 4. In the raised position hook 19 can then engage lift bar 36 on container 35. Container 35 can be elevated and lifted onto elongated body 11 in at least two ways. The first is where cylinders 14 on carriage 13 are extended or retracted which causes container 35 to be lifted up and onto the rear end 40 of body 11. Once cylinders 14 are fully retracted and jib 18 is returned to the starting position, the container will be up on the end of body 11. Carriage 13 is then moved toward front end 30 of the body by extending cylinder 12. This will cause container 35 to move toward the front end of body 11 via travel on rollers 16 or other type of friction reducing mechanism or bearing surface. When carriage 13 reaches the front end of body 11 the container will be fully loaded as shown in FIG. 10. The weight distribution of the loaded vehicle is important both legally and from a safety perspective. Because carriage 13 can be moved the length of elongated body 11 our invention has the ability to position a loaded container anywhere along the length of the hoist, thus distributing the load in the most efficient manner. This is accomplished by the movement of carriage 13. FIG. 9 illustrates a loaded container 35. This container may be position further forward 51 or rearward 50 as container 35 is releasable engaged to carriage 13 and the movement of carriage 13 is controlled by extension and or retraction of multi-stage cylinder 12.

Figure 5:
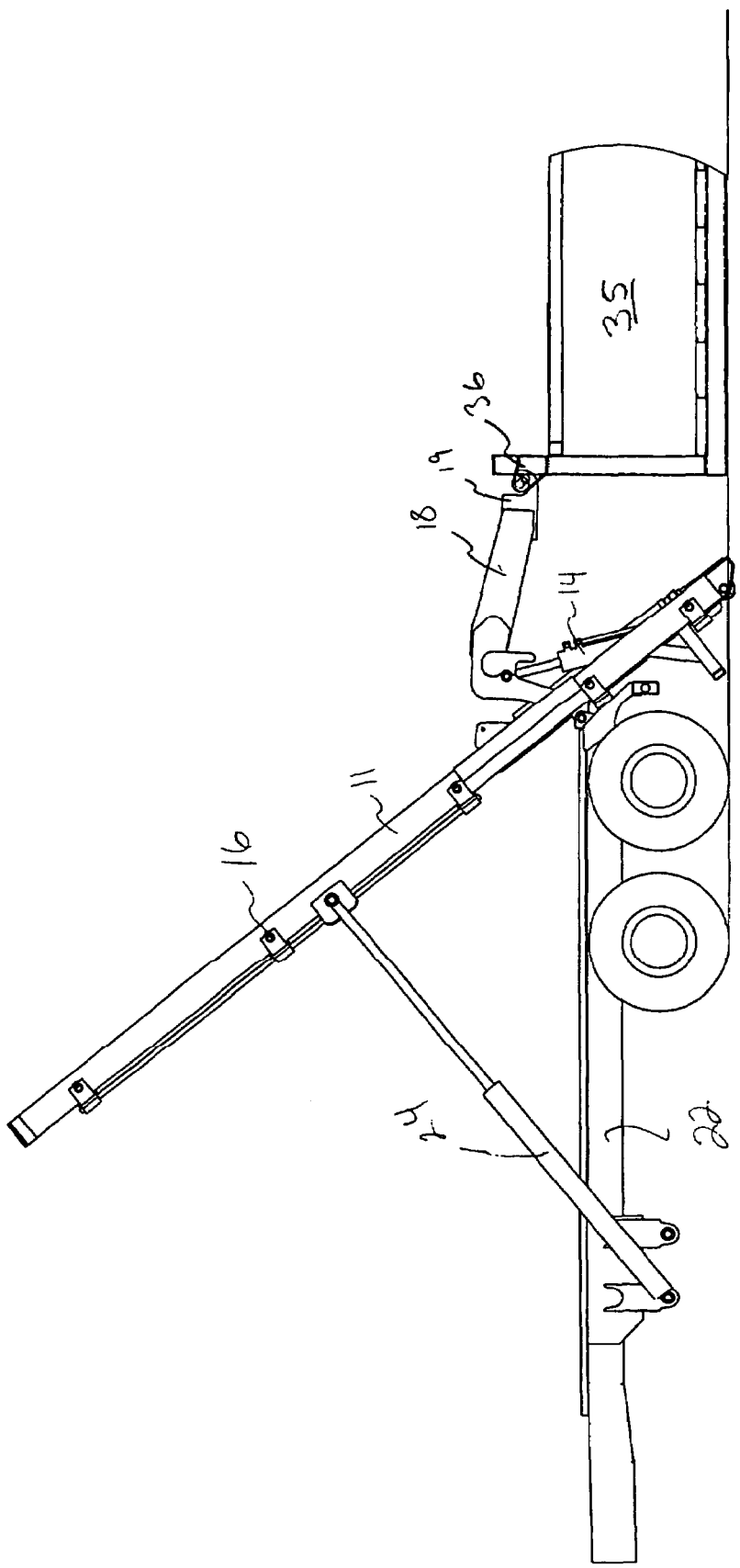
FIG. 5 is a side view of our invention using the jib and hook device and with the elongated body elevated at the front end to facilitate loading of the container.
Figure 6:
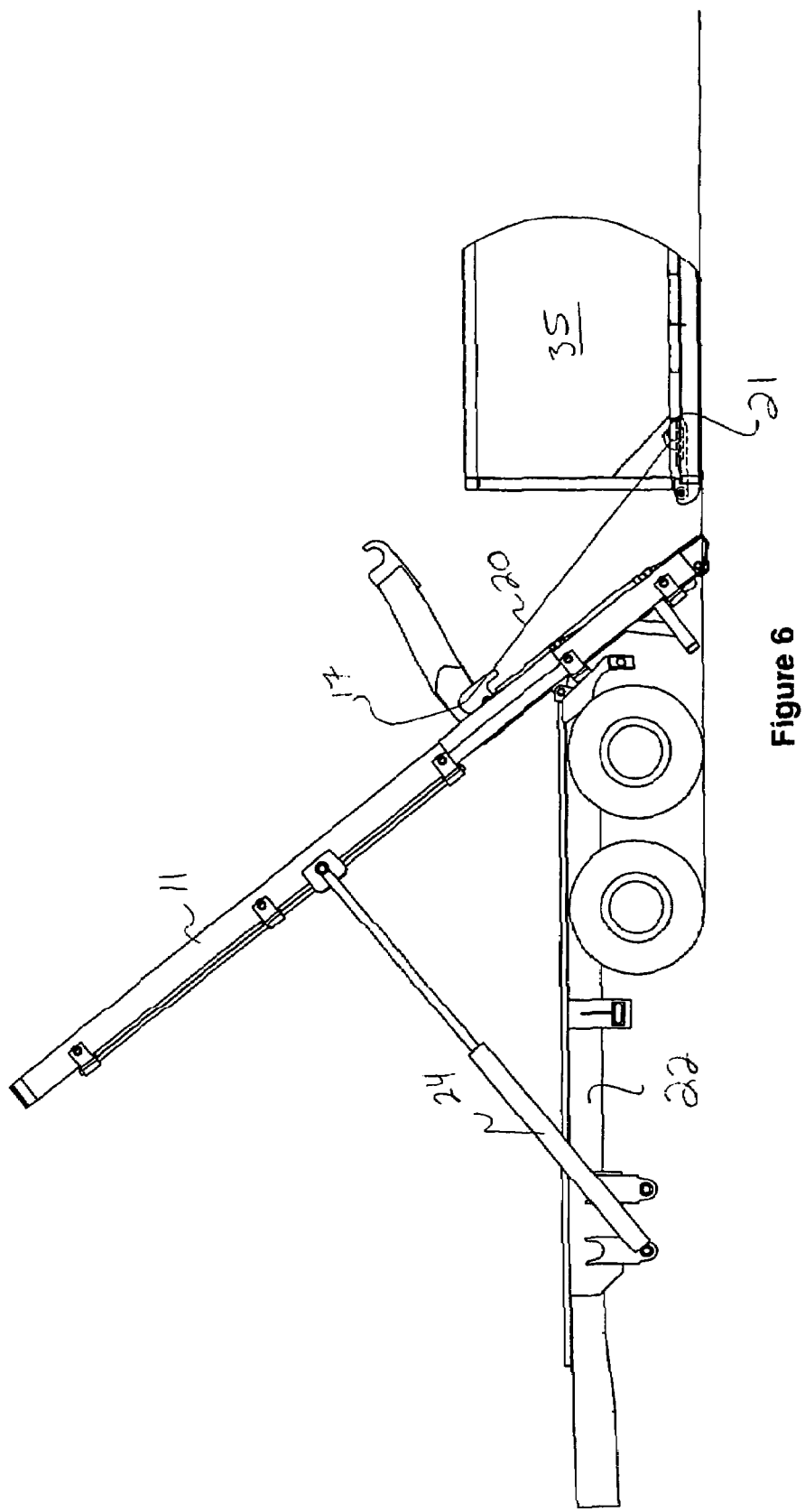
FIG. 6 is a side view of our invention with the elongated body elevated using the cable and sheave combination to load a container.
Figure 7:
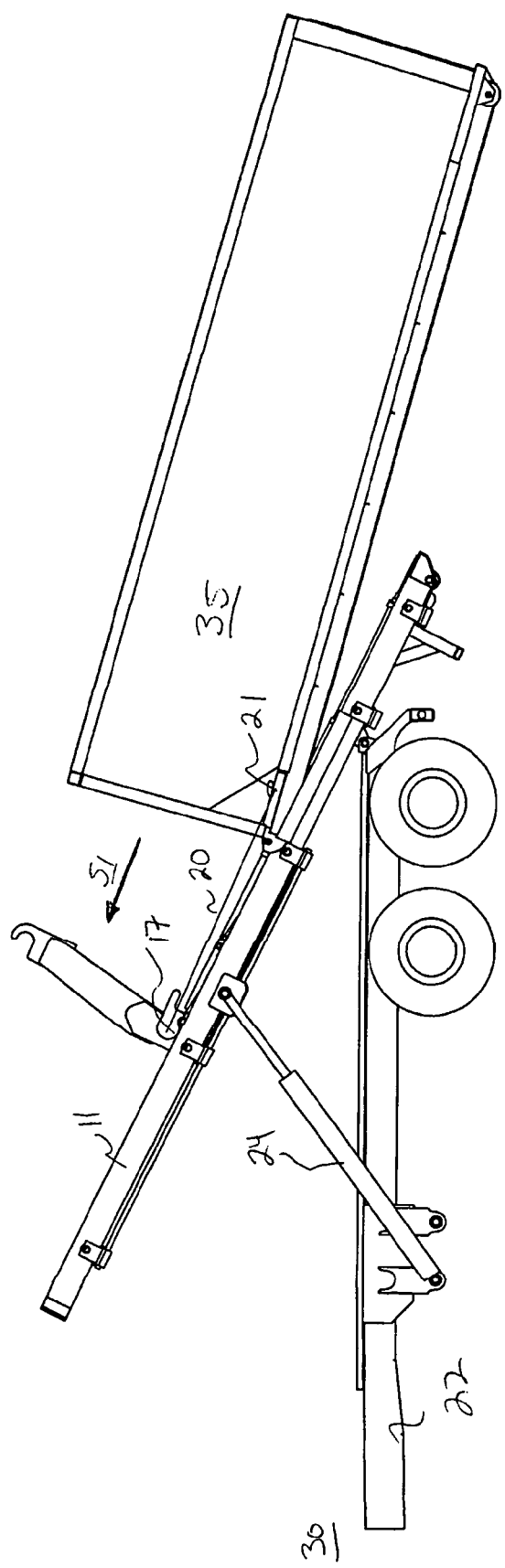
FIG. 7 is a side view of our invention showing the cable and sheave combination loading a container onto a partially elevated elongated body.
Figure 8:
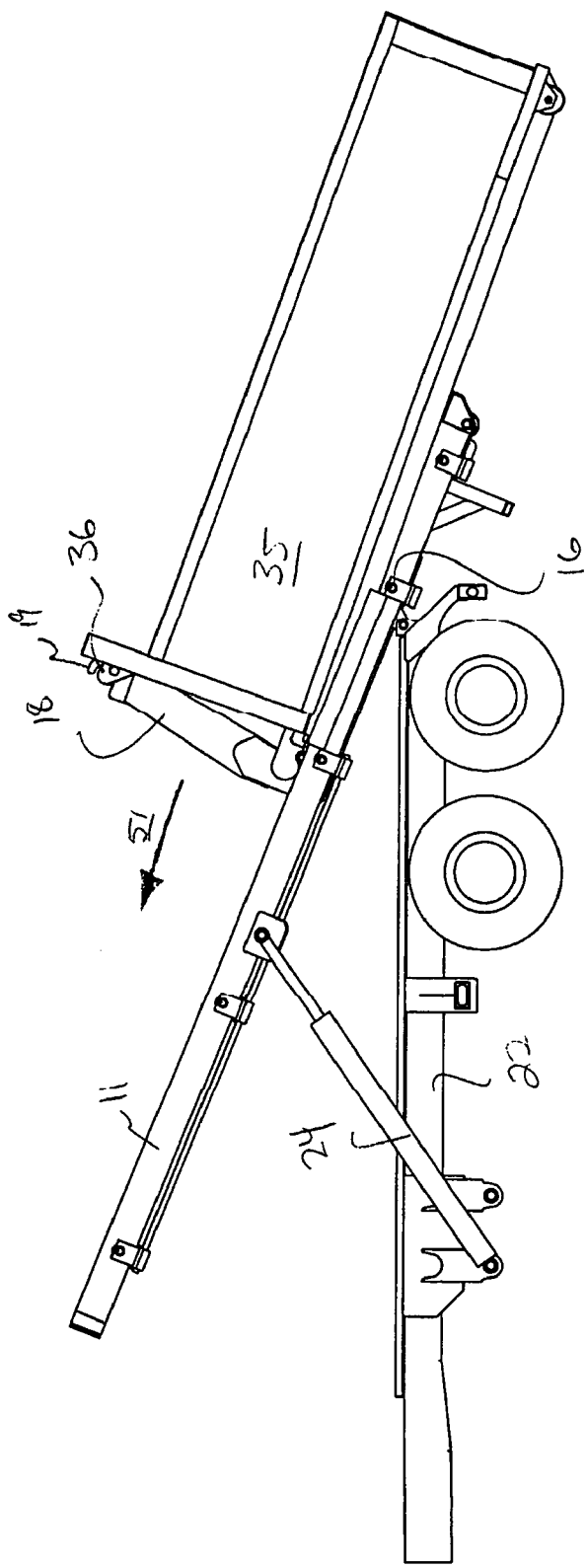
FIG. 8 is a side view of our invention showing the hook and jib device being used to load a container onto a partially elevated elongated body.

Alternatively, the container can be loaded by tilting body 11 as shown in FIGS. 5 and 6. Tilting body 11 is accomplished by extending hydraulic cylinder 24, which typically has a companion cylinder located on the opposite side of the vehicle frame 22. Hook 19 can engage lift bar 36 either before or after body 11 is tilted. As shown in FIG. 6, if container 35 is of the type requiring loading by a cable mechanism, cable 20 and engaging mechanism 21 is attached to container 35 while body 11 is in the tilted position. Once the cable (or hook) is attached to container 35, carriage 13 is moved by central cylinder 12 as shown in FIGS. 7 and 8 in direction 51 towards front end 30. As carriage 13 moves towards front end 30, cable 20 is pulled around sheave 17 such that the distance between container 35 and jib 18 continuously decreases until the container and the jib are adjacent to each as shown in FIG. 10. At this point the container is fully loaded onto body 11. If the carriage was moved forward while body 11 was in a tilted position, then cylinder 24 would then be retracted to bring body 11 and container 35 to a horizontal position parallel with vehicle frame 22 as shown in FIG. 9.

Another embodiment of our invention involves the inclusion of a trailer or other wheeled vehicle in addition to the transport vehicle that is designed or configured to receive a container or other structure directly from the elongated body of the system previously described. Such a trailer is sometimes referred to as a pup trailer, however, the particular design is not important to our invention as long as the additional trailer or flatbed is designed or configured to allow it to receive the container or other structure directly from the elongated body. Some of the benefits of using one or more additional trailers or other wheeled vehicles that can accept transfer of the container is as follows: 1) the containers can be transported from location to location without solely using the transport vehicle; 2) containers can be loaded on the trailers at a dispatch or storage location and then transported to another location where they are unloaded; and 3) multiple containers at a given location can be loaded onto trailers using one or more transport vehicles and then be transported to another location. This benefit allows the transport vehicle having the elongated body to remain at a given site to pick up and transfer other containers directly onto trailers or other wheeled vehicles for transport from the site. Depending on the size of the containers, it is desirable to employ trailers that can transport one or more containers. Prior art loading and unloading systems, especially those employing only a cable hoist can only pick up containers configured for a cable attachment, i.e. they can not pick up containers designed to be picked up with a hook & jib engaging mechanism. In addition, those cable hoist only systems can not easily transfer containers directly to a trailer because they have no means to push the container directly onto the trailer readily. Likewise, prior art systems having only a fixed hook & jib design suffer from the same problems as the cable hoist design, that being they can only pick up containers that are specifically designed to be picked up with that type of engagement mechanism, i.e. they can not pick up a container designed to be picked up with a cable hoist. Also, with the prior art hook & jib design, there is no way to transfer a container to a trailer while keeping the container in a substantially horizontal position. This means the container must be elevated on one end which increases the chance that the contents will spill.

Figure 13:
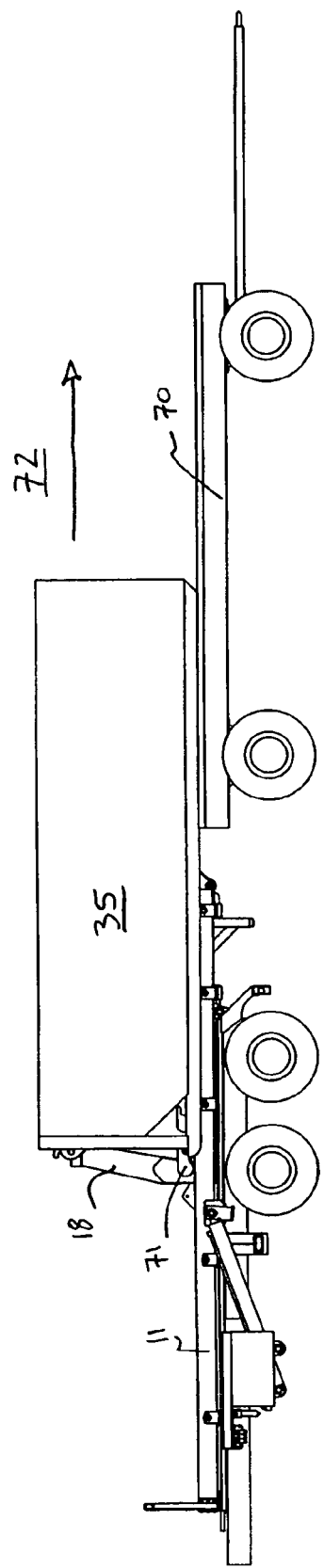
FIG. 13 is a side view of our invention showing one method to transfer a container to a trailer.

The transport vehicle of our invention does not suffer from these deficiencies because not only can it be used to pick up multiple types of containers, it can also use the sliding carriage to transfer the container directly onto a trailer or other wheeled vehicle while maintaining the container in a substantially horizontal plane. Once a container or other structure has been loaded onto the elongated body of our invention, the elongated body/transport vehicle's rear end is aligned with the trailer or other wheeled vehicle. FIG. 13 illustrates a container being unloaded from elongated body 11 of our invention onto a trailer 70. With the elongated body in a horizontal or substantially horizontal position, the central hydraulic cylinder is then retracted causing the carriage to move towards the rear of the elongated body. Front hold downs 71, as shown in FIGS. 11 and 13, or other bearing surfaces make contact with container 35 causing it to slide or move towards the trailer in the direction indicated as 72. Rollers, rails and/or other bearing surfaces (not shown) on container 35 engage a track or other bearing surface on trailer 70. The central cylinder is retracted until the container is positioned partially or fully onto the trailer. Whether or not the container is completely pushed onto the trailer depends on a variety of factors, including, but not limited to, the size of the container and/or the trailer, the dimensions of the engaging means, and the proximity of the trailer to the elongated body. However, if the container is only partially on the trailer when the central cylinder is fully retracted, then the engaging means can be used to complete loading of the container onto the trailer. The engaging means can be employed in a variety of ways, two of which will be describe here. The first involves rotating the engaging means or mechanism towards the rear of the elongated body so that it makes contact with the container. This would be performed once the carriage has traveled as far back as possible. As the engaging mechanism rotates towards a horizontal position it pushes the container onto the trailer.

Another approach is to reverse the direction of the carriage to move it forward until there is enough room to rotate the engaging means to a horizontal or substantially horizontal position without contacting the container. Once the engaging mechanism is positioned, the carriage is again moved towards the rear of the elongated body using the central cylinder until the engaging mechanism contacts and begins to push the container onto the trailer. The carriage is moved rearward until the container is fully positioned on the trailer. Once the container has been loaded on the trailer, the elongated body is now free to be used to collect another container.

Yet a third approach to loading container 35 onto a pup trailer involves the tilting elongated body 11 using cylinders 24. In loading the container using this approach, first the carriage is moved rearward with jib 18 in the vertical position as far as possible pushing the container partially onto the trailer 70. Cylinders 24 are then extended raising the front end of elongated body 11 and causing the container to slide further onto the pup trailer 70. When elongated body 11 is tilted as far as possible, jib 18 can be rotated toward the rear, if necessary, to further push the container fully onto trailer 70. Likewise, in some cases it might be necessary to move the vehicle that the elongated body is attached in reverse to push the container onto the trailer. Once the container is fully loaded onto trailer 70, then the elongated body is returned to a horizontal position. Of course, one skilled in the art will understand that a combination of the above-described loading techniques, including simultaneous operation of the hydraulic cylinders, may be employed depending on the size and shape of the container and the design of trailer 70.

Another benefit of our invention is the ability to dislodge the contents of the container using central cylinder 12. In some situations, the container is loaded with material that becomes lodged in the container after loading and transportation to a dump site. In these circumstances merely tilting the elongated body to elevate the front end of the container will be not be sufficient to cause the contents of the container to fall out of the rear end of the container into the dump site. Indeed, the customary method to empty a container using existing hoist devices is limited to raising the elongated body to the predetermined dump angle and then moving the vehicle in reverse and having the driver repeatedly apply the vehicles brakes rapidly to cause a rapid deceleration. Unfortunately, this prior method of emptying containers causes excessive wear on the vehicle and hoist mechanism resulting in damaged parts and increased frequency of maintenance, especially to the vehicle's drive line and rear end differential. Our invention, because of the design of the central cylinder 12 avoids these problems and provides a safer method of emptying lodged loads from the container. Loads that are difficult to empty from open top containers include, sludge materials, frozen granular materials and construction debris which may bridge across the container width. In the case of closed top containers, these are commonly used to receive material from a compaction device. Loaded materials are densified as a result of the compaction forces exerted, thus the newly densified material in the closed container often have great expansion forces which can "lock" the material into the container. Freezing winter conditions greatly magnify this effect. Because the traditional method of backing up and rapid braking does not dislodged the contents it becomes necessary to dig out the container with a mechanical device, such as a back-hoe or similar device, which takes time, costs money and ties up equipment. Further, the roll off hoist and loaded container must leave the emptying area to go to a safe solid footing area before this alternative emptying method can be performed.

Our invention provides a method of rapidly moving only the container, and not the vehicle or the elongated body, while the container is in a tilted position on the elongated body. The front of the elongated body 11 is elevated to a predetermined dump angle, similar to the angle shown in FIGS. 5 & 6, by extending hydraulic cylinders 24. Carriage 13, which is slidably connected to the elongated body 11 and indirectly connected to container 35 through an engaging means, can move forward and backwards along the elongated body by actuating central cylinder 12. Repeated movement of the container back and forth along the dump angle of the elongated body using movement of carriage 13 creates a shaking action similar to shaking salt out of a salt shaker. This shaking action is only possible because of the design of the central cylinder where the smallest diameter stage 80 (see FIG. 11) of multi-stage hydraulic cylinder 12 is the first stage to retract when multi-stage cylinder is fully extended. Rapid movement of the cylinder will result with the system hydraulic fluid flowing through the smallest diameter section 80 of the multi-stage cylinder 12. We have found that the shaking motion is most effective when the engaging means is a cable and cable sheave combination because when the carriage retracts two feet of cable will be released per foot of travel of the carriage, thus further intensifying the shaking action. This occurs because cable sheave 17 is attached to carriage 13 and moves rearward 50 with the carriage and the fixed length cable 20 moves across sheave 17.

Although the invention has been described with respect to preferred embodiments, it is to be also understood that it is not to be so limited since changes and modifications can be made therein which are within the full scope of this invention as detailed by the following claims.

I claim:

1. A method for loading or unloading a container from a transport vehicle to a trailer or other wheeled vehicle comprising, in combination,
   a. providing an elongated body removably attached to a transport vehicle, where the elongated body has a front and rear, a carriage, with at least one bearing surface, slidably attached to the elongated body, and a multi-stage central hydraulic cylinder connected to the carriage and having a fixed end and a moving end, where the carriage is substantially rectangular in shape and adapted to remain in a linear plane defined by the elongated body;
   b. providing a container having a front end positioned on the elongated body and in bearing contact with the bearing surface on the carriage, where the carriage moves along the entire length of the elongated body when the central hydraulic cylinder is extended and retracted;
   c. positioning and aligning the transport vehicle with a trailer or other wheeled surface;
   d. sliding the container onto the trailer or other wheeled vehicle by retracting the central hydraulic cylinder so that the carriage moves towards the rear of the elongated body while the bearing surface pushes on the front end of the container causing it to at least partially move onto the trailer or other wheeled device; and
   e. rotating an engaging means pivotally attached to the carriage towards the rear of the elongated body, whereby the engaging means comes into bearing contact with the container causing the container to slide in a rearward direction along the elongated body.

2. The method of claim 1 further comprising rotating the engaging means after the carriage has traveled to the rear of elongated body when the central cylinder is fully retracted.

3. The method of claim 1 further comprising pushing the container completely onto the trailer or other wheeled vehicle by rotating the engaging means.

4. The method of claim 1 further comprising raising the front of elongated body causing the engaging means to push the container onto the trailer or other wheeled vehicle.

5. A method for unloading material in a container comprising, in combination,
   a. providing an elongated body removably attached to a transport vehicle, where the elongated body has a length defined by a front located adjacent to a transport vehicle cab and a rear located opposite the front, a carriage, with at least one bearing surface, slidably attached to the elongated body, and a multi-stage central hydraulic cylinder connected to the carriage, longitudinally extendable along the length of the elongated body, and having a fixed end and a moving end, where the carriage is substantially rectangular in shape and adapted to remain in a linear plane defined by the elongated body;
   b. providing a container having a front end, a back end, and a bottom, that is loaded with material positioned on the elongated body and in bearing contact at the front end and not the bottom with the bearing surface of the carriage;
   c. positioning the transport vehicle adjacent a dump site;
   d. elevating the front of the elongated body; and
   e. actuating the central hydraulic cylinder causing the carriage and container to move longitudinally forward and backward along a portion of the length of the elevated elongated member imparting a shaking action to the container and causing the material in the container to be unloaded at the dump site out of the back end.

6. A system for loading or unloading a container from a transport vehicle comprising, in combination,
   a. an elongated body removably attached to a transport vehicle, where the elongated body has an outside and a length defined by a front located adjacent to a transport vehicle cab and a rear located opposite the front;
   b. a carriage slidably attached to the outside of the elongated body that travels from the rear to the front of the elongated body during loading of a container onto the transport vehicle, where the carriage is substantially rectangular in shape and adapted to remain in a linear plane defined by the elongated body;
   c. a multi-stage central hydraulic cylinder having a fixed end and a moving end, where the fixed end is attached to the rear of the elongated body and the moving end is attached to the carriage such that extending and retracting the central hydraulic cylinder moves the carriage from the rear of the elongated body to the front of the elongated body and necessarily causes the container attached to the engaging means to be loaded onto the elongated body;
   d. means for releasably engaging a container, where the engaging means is connected to and moves with the carriage along the entire length of the elongated body when the central hydraulic cylinder is extended or retracted; and
   e. a slidable cylinder support not connected to the carriage and attached to at least one stage of the central hydraulic cylinder where the slidable cylinder support is configured to move independently of the carriage and only when the at least one stage moves, to support the central hydraulic cylinder, and to move along the elongated member during extension and retraction of the central hydraulic cylinder.

* * * * *